United States Patent

Wolff

[11] Patent Number: 5,848,413
[45] Date of Patent: Dec. 8, 1998

[54] METHOD AND APPARATUS FOR ACCESSING AND PUBLISHING ELECTRONIC DOCUMENTS

[75] Inventor: Gregory J. Wolff, Mountain View, Calif.

[73] Assignees: Ricoh Company, Ltd., Tokyo, Japan; Ricoh Corporation, Menlo Park, Calif.

[21] Appl. No.: 372,784

[22] Filed: Jan. 13, 1995

[51] Int. Cl.⁶ .................................................. G06F 17/30
[52] U.S. Cl. .......................... 707/10; 358/448; 707/3
[58] Field of Search ......................... 395/600, 610, 395/200.03, 603; 358/440, 448, 453; 382/261.1, 305, 306

[56] References Cited

U.S. PATENT DOCUMENTS

| | | | |
|---|---|---|---|
| 4,013,827 | 3/1977 | Starck et al. | 358/263 |
| 4,553,206 | 11/1985 | Smutek et al. | 364/300 |
| 4,553,261 | 11/1985 | Froessl | 382/57 |
| 4,574,395 | 3/1986 | Kato | 382/61 |
| 4,760,606 | 7/1988 | Lesnik et al. | 382/48 |
| 5,093,873 | 3/1992 | Takahashi | 382/61 |
| 5,099,340 | 3/1992 | Kamada et al. | 358/403 |
| 5,115,326 | 5/1992 | Burgess et al. | 358/440 |
| 5,129,016 | 7/1992 | Murakami et al. | 382/61 |
| 5,175,684 | 12/1992 | Chong | 364/419 |
| 5,301,315 | 4/1994 | Pellicano | 395/600 |
| 5,337,362 | 8/1994 | Gormish et al. | 380/54 |
| 5,339,412 | 8/1994 | Fueki | 395/600 |
| 5,436,960 | 7/1995 | Campana, Jr. et al. | 379/58 |
| 5,461,488 | 10/1995 | Witek | 358/402 |
| 5,497,319 | 3/1996 | Chong et al. | 364/419.02 |
| 5,530,852 | 6/1996 | Meske, Jr. et al. | 395/600 |
| 5,548,666 | 8/1996 | Yoneda et al. | 382/276 |
| 5,563,955 | 10/1996 | Bass et al. | 382/101 |
| 5,579,407 | 11/1996 | Murez | 382/164 |
| 5,644,408 | 7/1997 | Li et al. | 358/448 |

*Primary Examiner*—Paul R. Lintz
*Attorney, Agent, or Firm*—Blakely, Sokoloff, Taylor & Zafman LLP

[57] ABSTRACT

A document retrieval and accessing system in which documents are provided with links to other documents. Selection of one or more of the links causes the corresponding documents to be retrieved and sent to the requesting party. Then retrieved documents may also include links to yet even more documents.

34 Claims, 8 Drawing Sheets

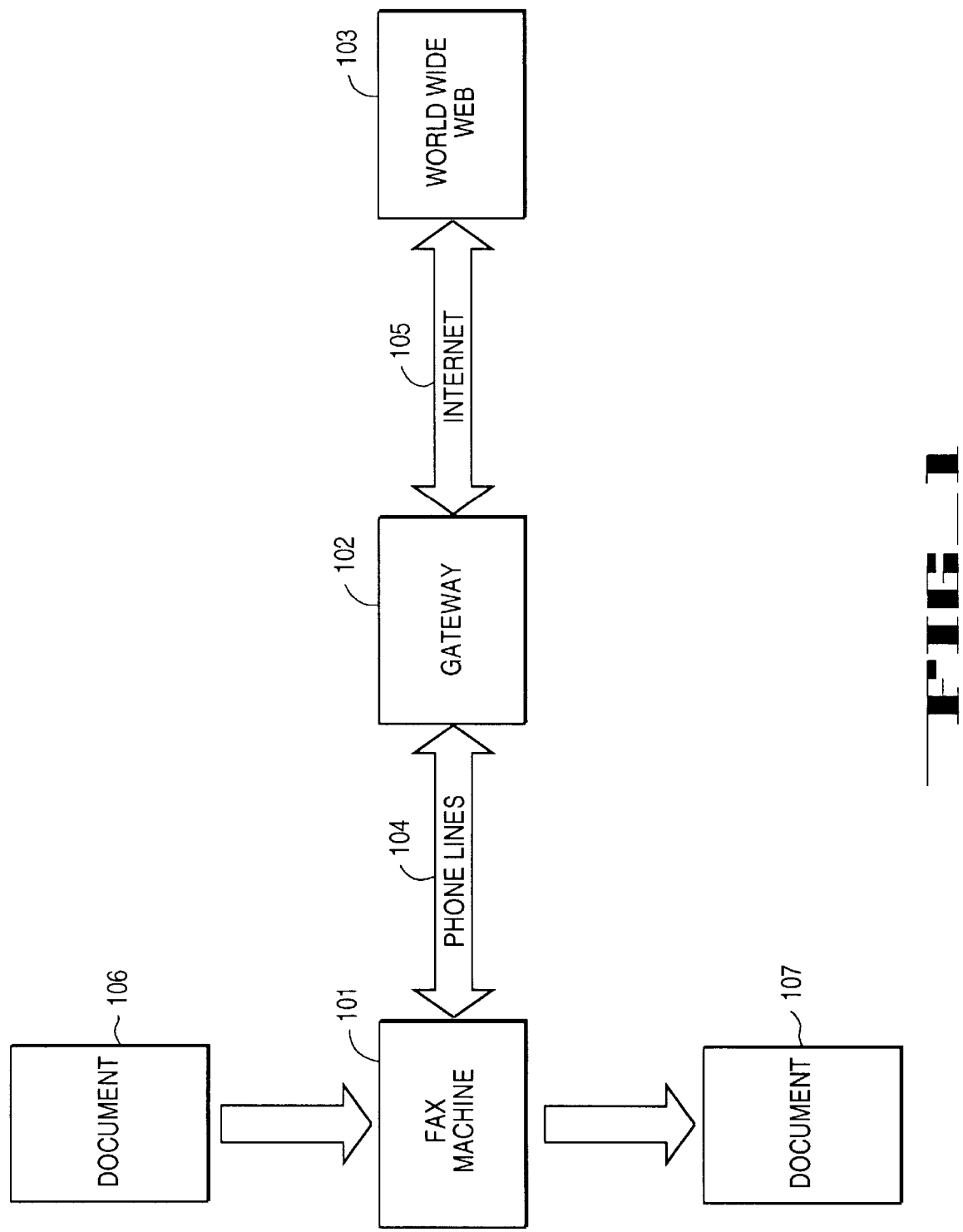
FIG_1

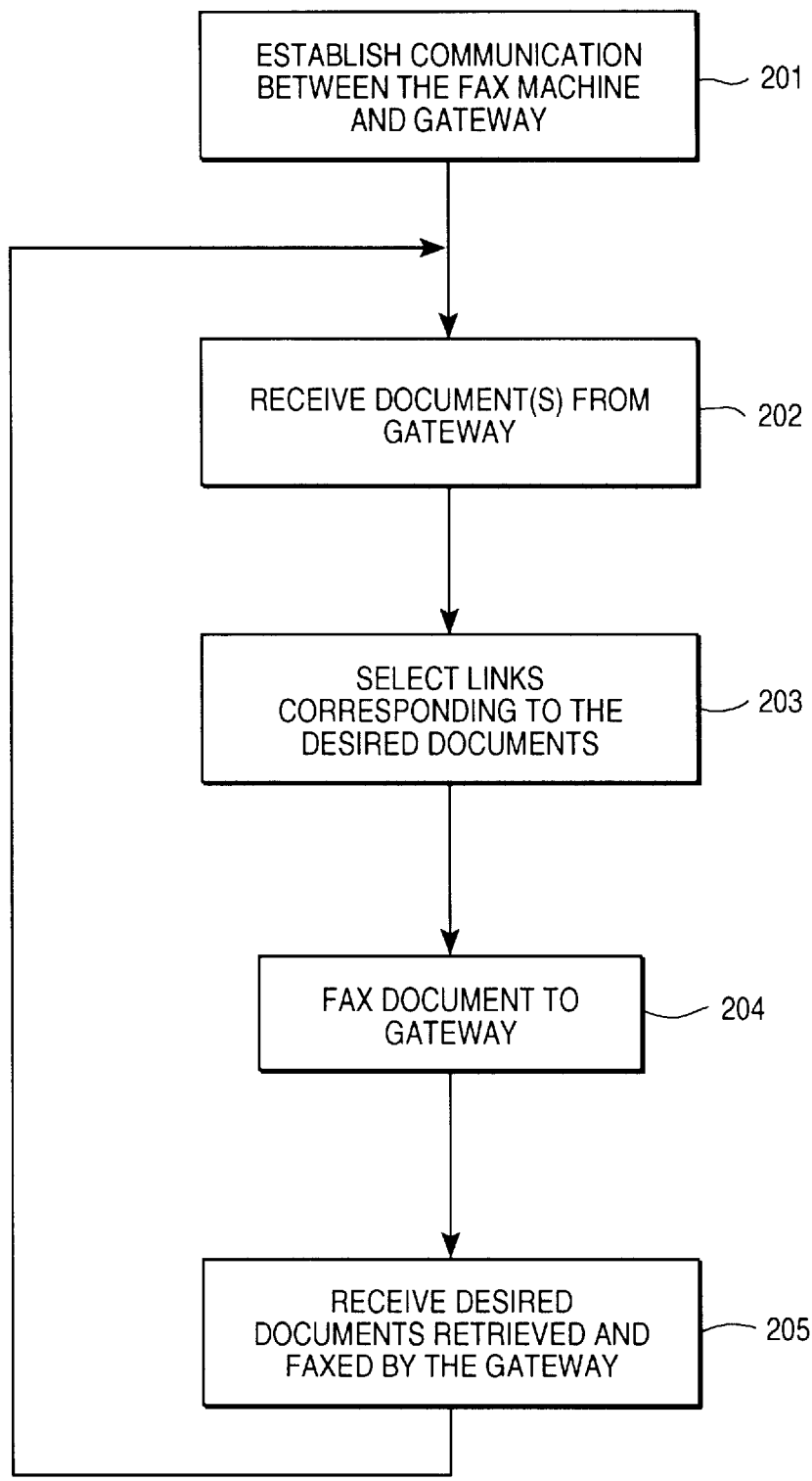
FIG_2

Web Fax gateway

This is the home page for the web fax gateway. This page was sent in response to a blank page (or one for which we failed to properly parse the links).

Words or pictures with codes under them, like this *word* represent active links. You may retrieve the document associated with such a link by drawing a complete circle around the word or picture (make sure that the circle includes the code below the word or picture) and faxing the document back to the WebFax gateway.

You might like to follow some of these links:

- Ricoh California Research Center home page.

- Greg Wolff's home page.

- Steve Savitzky's home page.

- Some demo sites.

FIG_3

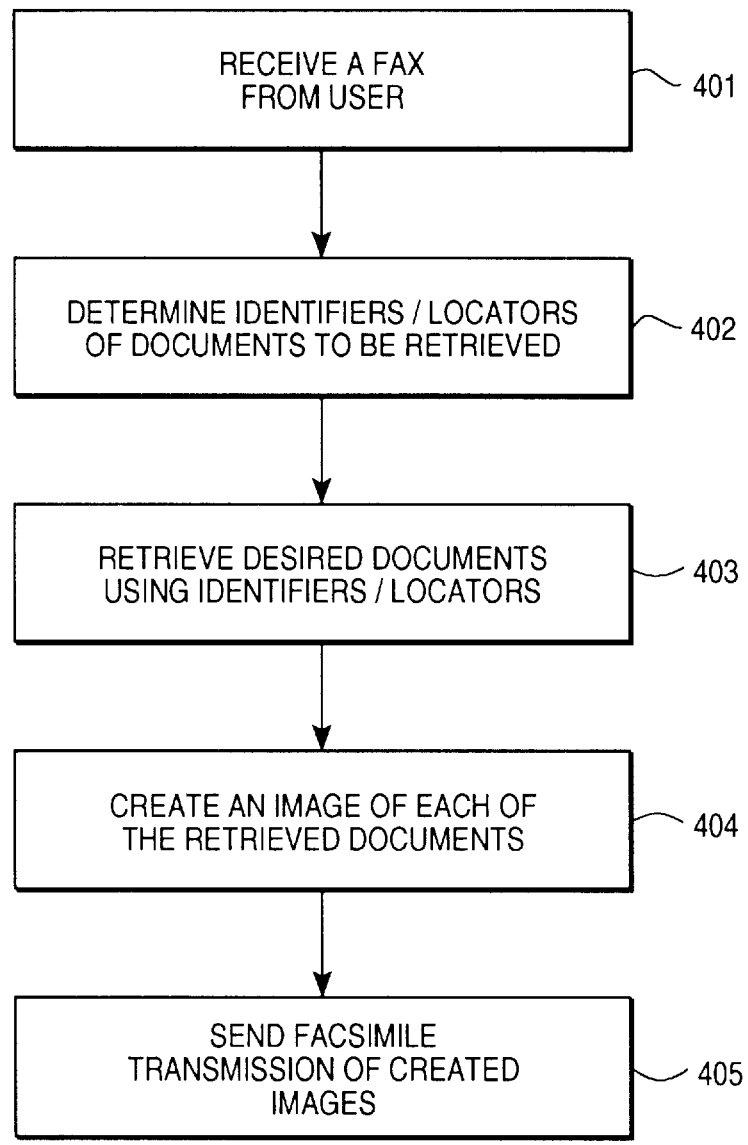
FIG_4

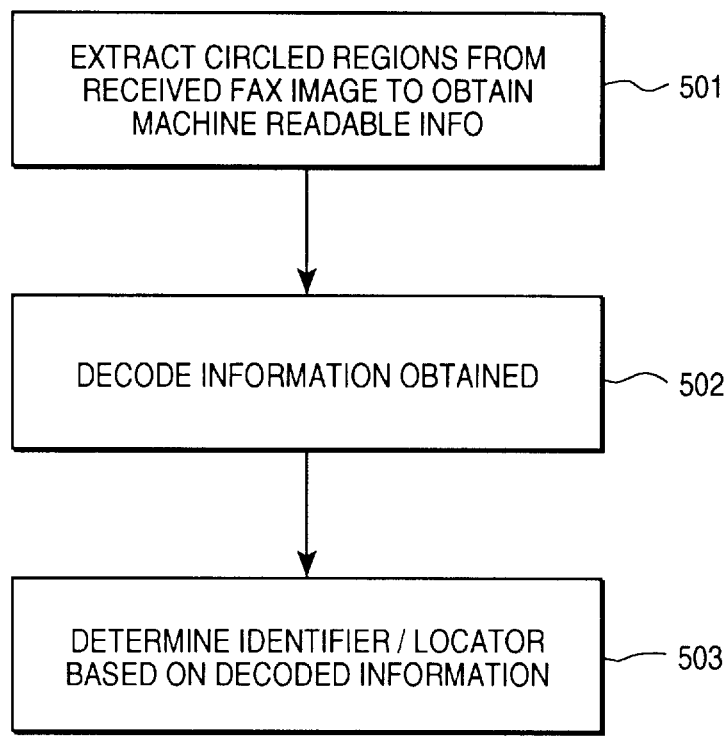
FIG_5

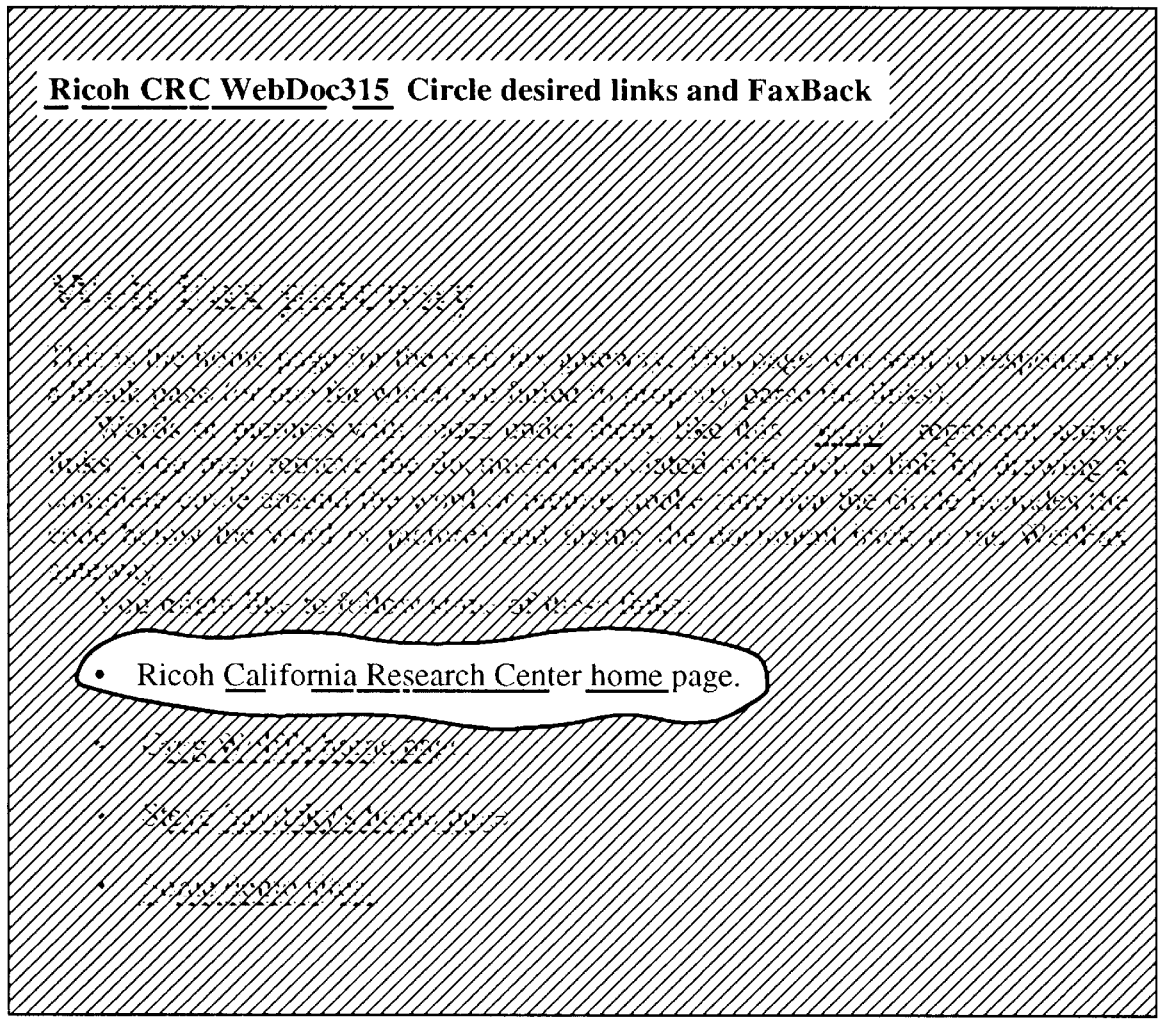
FIG_6

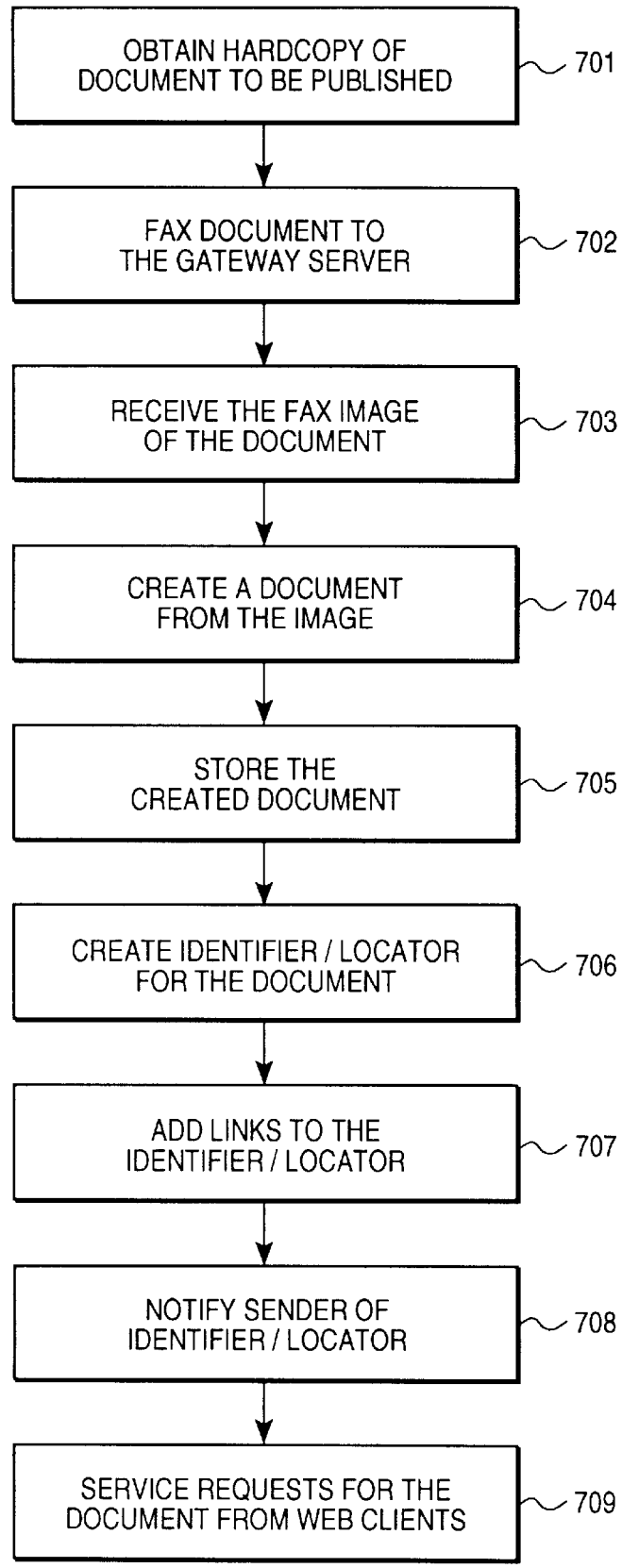
FIG_7

METHOD AND APPARATUS FOR ACCESSING AND PUBLISHING ELECTRONIC DOCUMENTS

FIELD OF THE INVENTION

The present invention relates to the field of document retrieval and publication; more particularly, the present invention relates to accessing documents from and publishing documents to an interconnected network, such as the World Wide Web, or other similar document resource supply using a facsimile (fax) machine.

BACKGROUND OF THE INVENTION

The "World Wide Web" (hereinafter referred to herein as "the Web") is a term that describes the interconnected, on-line documents that can be accessed via computer systems hooked to the Internet using software clients. In the prior art, these software clients are graphical browsers, such as Mosaic and Netscape, that permit a user to select various documents. Upon selection, a graphical browser retrieves the documents and provides them to the user, either by displaying them on a display screen or by causing them to be printed on a hard copy device, such as a printer.

Portions of documents displayed using the graphical browser contain hypertext links. The hypertext links link graphics or text on one document with another document on the Web. Documents containing hypertext links are created prior to their "publishing" on the Web. That is, a document that is to be published is provided to a server which creates the document and, essentially, publishes the document by permitting its access by others on the Web. Each hypertext link is associated with a Universal Resource Locator (URL) that identifies and locates a document on the Web. When a user selects a hypertext link, using, for instance, a cursor, the graphical browser retrieves the corresponding document(s).

World Wide Web servers and clients, such as Mosaic, have opened the door to on-line publishers and consumers of information. However, these servers and publishers have only been available to those having an Internet connection. In other words, individuals that do not have a direct Internet connection do not have access to documents and other resources available through the Web. It is desirable to allow access to the Web to individuals that do not have such a direct connection.

The present invention provides access to the Web to individuals that do not have a connection to the Internet or other network/resource supply. The present invention allows individuals to retrieve or publish documents on the Web as if actually connected to the Web themselves. In this manner, the present invention allows an individual to have both client and server capabilities when that individual does not have a direct connection to a network.

SUMMARY OF THE INVENTION

The present invention provides a method and apparatus for accessing information. The present invention provides a method and apparatus to receive a facsimile of a first document from a first location and to extract a resource (e.g., document) identifier, such as, for instance, a URL, from the facsimile image. The present invention also provides a method and apparatus for retrieving a document corresponding to the extracted resource identifier and sending the retrieved document to the first location.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 is a block diagram of one embodiment of the document retrieval and publishing system of the present invention.

FIG. 2 is a flow diagram of one embodiment of the document retrieval process performed by a facsimile machine user in the present invention.

FIG. 3 illustrates an example of a hard copy document with machine readable information according to the present invention.

FIG. 4 is a flow diagram of one embodiment of the document retrieval process performed by the gateway of the present invention.

FIG. 5 is a flow diagram of one embodiment of the process for extracting selected machine readable information from a received document according to the present invention.

FIG. 6 illustrates an example of a painted image that results from applying one embodiment of the extraction process of the present invention.

FIG. 7 is a flow diagram of one embodiment of the document publication process of the present invention.

DETAILED DESCRIPTION OF THE PRESENT INVENTION

Figure 8:
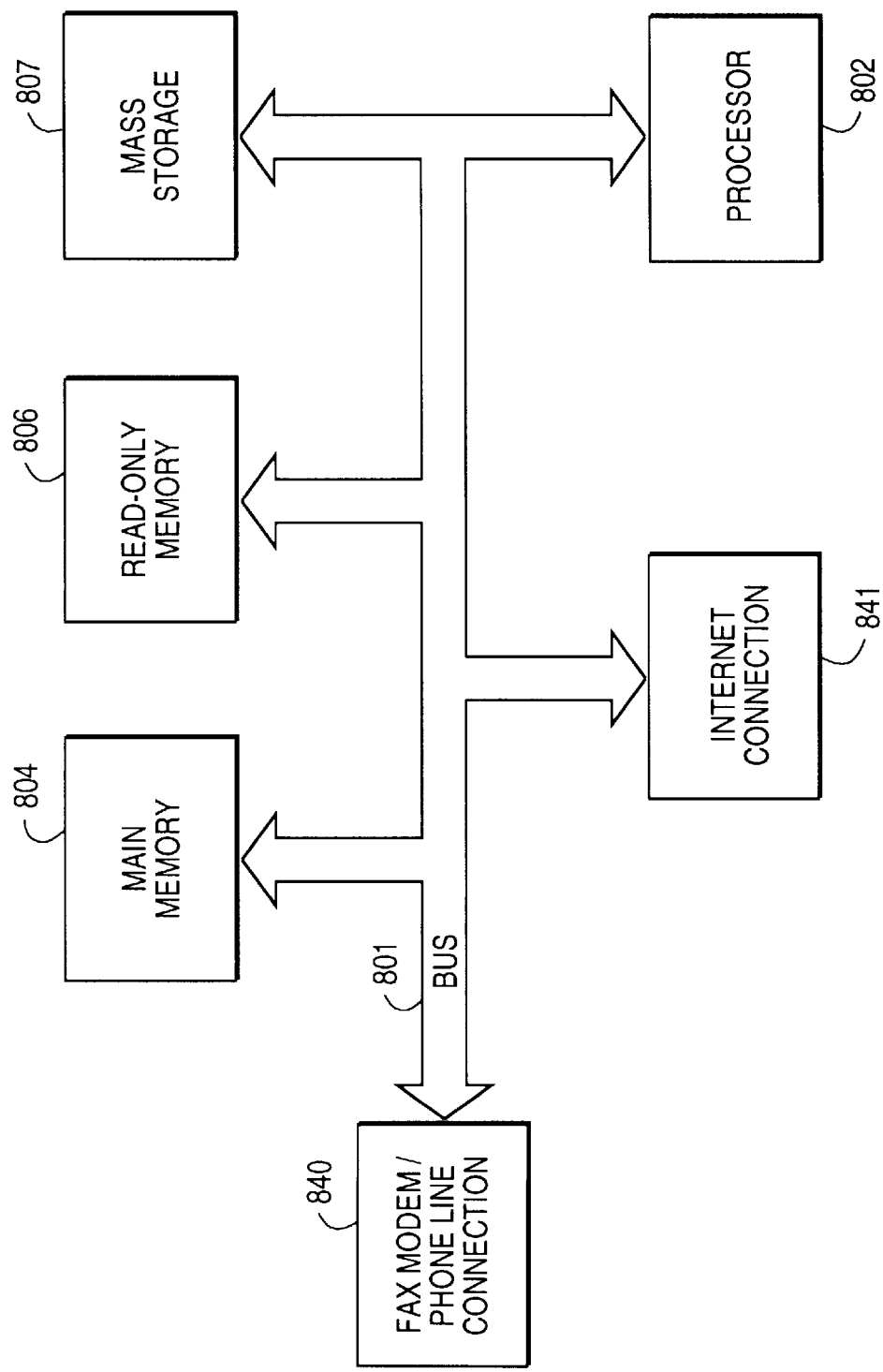
FIG. 8 is a block diagram of one embodiment of a computer system of the present invention.

A method and apparatus for accessing a network or other resource. In the following detailed description of the present invention numerous specific details are set forth, such as resource and document identifier types, document types, etc., in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating"

or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Overview of the Present Invention

The present invention provides access to electronic documents. In the present invention, access to electronic documents is accomplished by marking images that may be on documents or displays, exchanging various documents and displaying bitmaps of various documents.

The present invention allows a facsimile (fax) machine to act as a Web client and retrieve text and images from any Web site. In this manner, the user can view multiple pages from the Web. The present invention also allows the fax machine to act as the interface to a Web server, publishing information on-line for access by any Web client. Therefore, the present invention allows anyone to use their fax machine as a Web client or as an interface to a Web server. In this manner, an individual without a connection to the Web may interact with the Web as if a connection existed.

Using a Fax Machine as a Web Client

FIGS. 1 and 2 illustrate one embodiment of the present invention. FIG. 1 is a block diagram of one embodiment of the system of the present invention. Referring to FIG. 1, a fax machine 101 is coupled to gateway 102 via phone lines 104. Gateway 102 is also coupled to Internet 105, or other network or document resource, which provides access to the Web 103.

In one embodiment, fax machine 101 operates as a typical fax machine in the prior art. That is, fax machine 101 is capable of sending and receiving facsimile transmissions using phone lines 104. Also, fax machine 101 includes a scanning mechanism to scan documents, such as, for example, document 106, which thereafter may be transmitted over phone lines 104. Fax machine 101 also includes a print engine to produce hard copy representations of received facsimile transmissions, such as document 107.

In the present invention, gateway 102 interfaces fax machine 101 to the Web 103 (via the Internet 105). In one embodiment, gateway 102 comprises a computer system, or workstation, that is coupled to phone lines 104 via fax modems, which are well-known in the art. The functionality and an exemplary implementation of gateway 102 will be described below. Gateway 102 is not limited to interfacing with only one fax machine (102) and may support any number of fax machines. However, gateway 102 may be limited by the number of document retrieval requests or publication requests that can be supported at any one time.

With respect to the Web 103, it should be noted that the present invention is not limited to retrieving and publishing documents on the "World Wide Web" or the "Internet." The teachings of the present invention may be applied to various networks, data and document storage and archival facilities, or other types of client/server systems which have documents or other information available upon request.

The system of the present invention does not require a facsimile machine as long as the system includes components and devices that can provide functionality provided by the facsimile machine. These functions include, but are not limited to, being able to exchange documents, i.e. by receiving one version of a document and sending another version, and being able to view a document by creating a bitmap or other display of the document.

FIG. 2 is a flow diagram illustrating the process of document retrieval performed by the user of fax machine 101 according to the present invention. Referring to FIG. 2, the user begins the process by initiating communication between fax machine 101 and gateway 102 (processing block 201). In one embodiment, the user establishes communication with gateway 102 by sending a facsimile transmission of a specific document to gateway 102. In one embodiment, this document is a blank page.

As a result of establishing communication with gateway 102, the user receives a document, such as document 107, from gateway 102 that is output from fax machine 101 in hard copy form (processing block 202). The first document received by the user from gateway 102 is referred to herein as the home page. The document may have multiple pages.

Other methods of establishing communication to receive the document may be used. For instance, an individual may verbally or otherwise notify an operator of gateway 102 to request the document be sent to the user of fax machine 101. The document may be sent automatically or otherwise by, for instance, another user of the Web. Similarily, an automatic service (e.g., daily electronic newspaper) may notify the user when a particular page changes. Note also that the user may have received the document by other means, such as by mail, air service, and/or delivery.

The document received from gateway 102 contains links to other documents that may be retrieved for the user. In one embodiment, the links are hypertext links. The links are encoded and formatted into machine readable information on the document. The machine readable information may be in a digital format, such as a bar code or digital paper, one embodiment of which is described in U.S. Pat. No. 5,337,362, entitled "Method and Apparatus for Placing Data Onto Plain Paper", issued on Aug. 9, 1994, and assigned to the corporate assignee of the present invention. Other types of encoding may be used in the present invention as long as identification and selection of links are possible.

In one embodiment, the documents received from gateway 102 contain machine readable information that indicates the hypertext links or "hot spots" that can be circled to retrieve further documents. In one embodiment, the machine readable information is placed beneath an image or piece of text. In this manner, the user is made clearly aware of what links are active. The machine readable information may indicate the Universal Resource Locator (URL) of the linked documents to be retrieved. The URL identifies and locates the document on the World Wide Web, and is well-known in the art. An exemplary document showing text with bar codes representing links beneath the text in the document is shown in FIG. 3. In an alternative embodiment, icons could be used to represent links. Many icons may fit on a single page, and the icons themselves could include machine readable URL information.

The user selects one or more links on the document, indicating those documents that are desired (processing block 203). In one embodiment, the user selects a link on the document by circling the link. Any manner of encircling a link or marking a link as a means of selecting that link may be used in the present invention. In other words, a square may be drawn around a link to select it.

In an alternative embodiment, the document may include a special input location (e.g., a box) into which the user writes the desired links or documents or some other information to identify the desired documents. For instance, the document may include a form with entry boxes for the user to write selections. Note that in such a case, gateway 102 may perform some type of character recognition to determine the selections. Thus, the present invention allows users to fill out forms via fax.

In one embodiment, a link may be selected by inputting numbers associated with each link on a keypad, such as the keypad of fax machine 101.

Referring to FIG. 3, one of the links is selected by the user by circling the bar code corresponding to the link. Note that the text or graphics accompanying the link does not have to be circled or otherwise selected. A user may select any number of links on the document. In other words, the user may circle any number of bar codes contained in the document.

Selection may include together highlighting a portion of an image (e.g., circling a link) and also placing a mark on a particular location of the image. Based on both the highlighting and the location of the mark, one or more documents may be retrieved.

After selection, the user feeds the document into fax machine 101 and faxes the document to gateway 102 (processing block 204), which, in turn, retrieves the document from any where in the world via the World Wide Web 103, or any electronically accessible source, and faxes rendered versions of requested documents back to fax machine 101 or any electronically accessible source.

Fax machine 101 produces hard copies of the retrieved documents faxed by gateway 102 (processing block 205). The user can retrieve further information by selecting (e.g., circling) links on the new newly received documents and then repeating processing blocks 204 and 205.

The Gateway of the Present Invention

Gateway 102 receives and processes facsimile transmissions received from fax machine 101 that contain a document retrieval request. Gateway 102 fulfills the requests by retrieving documents corresponding to the links selected on the document. The process of the processing logic of gateway 102 to receive and fulfill the document retrieval request is illustrated by the flow diagram in FIG. 4.

The processing logic of gateway 102 begins when the user faxes a document with circled links (e.g., hypertexts, etc.) to gateway 102. Referring to FIG. 4, gateway 102 initially receives the facsimile image, e.g. via a fax modem (processing block 401), such as, for instance, the image of the document shown in FIG. 3.

Upon receipt of the fax, gateway 102 determines the locator/identifier (e.g., the URL) of the document(s) to be retrieved from the faxed image (processing block 402). Gateway 102 performs the determination by extracting the machine readable information selected by the user. In one embodiment, gateway 102 extracts the selected links using recognition and digital decoding techniques that are well-known in the art. One embodiment of the extraction process performed by gateway 102 is described below in conjunction with FIG. 5.

In one embodiment, a "barcode" or "one-dimensional digital paper" is used that is insensitive to resolution differences between different bitmap representations of the image. The "bar codes" comprises alternating black and white spaces. The information is contained in the relative length of the runs of the black. Each code begins with a special marker of a black space followed by a white space followed by another black space, where the length of the white space is approximately equal to the length of each of the surrounding black spaces. Subsequent runs of black are compared with the average length of the runs in the start sequence and are interpreted as multiples of that length. An ending sequence similar to the start sequence is required for a valid code. Any long run of white before the end sequence will invalidate the code. Since the machine readable code is based on the relative lengths of the runs, it is insensitive to the resolution and can be computed quickly in a single pass through the image. Thicker codes (e.g., the height) add redundancy, making it insensitive to skew and noise.

Where the document comprises, for instance, a form, gateway 102 may be required to perform recognition on specific areas or boxes on the image to identify the documents to be retrieved. Gateway 102 may also have to locate marks (e.g., "x", etc.) placed on the document by the user that are part of the document selection process.

Using the locator/identifier, gateway 102 retrieves the desired documents over the Internet 105 (processing block 403). In one embodiment, gateway 102 locates and retrieves the document(s) using URLs extracted from the fax received from the user. Note that gateway 102 may also have to use marks (e.g., "x") on the image along with the locator/identifier to retrieve a document. In such a case, a different document is sent if the mark is made in a different location, even though the locator/identifier is the same.

Once the desired documents have been obtain, gateway 102 creates an image of each document for transmission to the user (processing block 404). In one embodiment, gateway 102 creates images by parsing, formatting and rendering the documents. The parsing of the documents, as well as formatting and rendering of the parsed documents, includes the conversion of document identifiers/locators associated with the retrieved documents to a machine readable code (e.g., bar code, digital paper, etc.) to be included in the images faxed to the user (to enable user selection of additional documents). Rendering is necessary for most documents to convert the data from ASCII to a raster bitmap, the protocol used by fax machines (and other marking engines).

Once the image has been created, gateway 102 sends the image by fax to the user (processing block 405). Upon receipt of the retrieved documents from gateway 102, the user may select additional documents for retrieval as described above. In this manner, a fax machine may retrieve any document on the Web without having an Internet connection available to itself.

Gateway 102 may return not only a requested page, but also all or some number of pages pointed to by that page. On the other hand, gateway 102 may split up pages that are very long and only return part of the page, along with a link to the remainder.

FIG. 5 illustrates one embodiment of the extraction process performed by gateway 102 of the present invention. Referring to FIG. 5, gateway 102 initially extracts circled regions from the faxed image received via its fax modem(s) (processing block 501). In one embodiment, the circled regions are extracted by painting the entire image a single color (e.g., black) except for the circled regions. Thus, only the machine readable information (e.g., bar codes) that is circled remain after painting the image. An example of a painted image is shown in FIG. 6.

Then the processing logic of gateway 102 searches the document for circled regions (non-painted regions) based on the pixel color until the circled regions are obtained. Once located, the information in the circled regions is extracted.

After extracting the circled regions, the information is decoded to determine the identifier/locator, URL, (processing block 502). Thus, the bar codes or other machine readable code circled on the received faxed image are decoded to produce a code.

Using the code, gateway 102 obtains the identifier/locator (e.g., URL) (processing block 503). In one embodiment, the code comprises the identifier/locator (e.g., the URL). In an alternative embodiment, the code resulting from the decoding performed by gateway 102 is used by gateway 102 as a pointer to an accessible storage location, list or table that contains the identifier/locator. As a pointer, the code may include a first portion representing a pointer to the list or table and a second portion indicating the entry in the list or table that contains the identifier/locator. Note that in one embodiment, all of the identifiers/locators may be appear on the face of the faxed image, with the code indicating which of the listed identifiers/locators the user has selected.

Using the Gateway as a Web Server

The present invention may also allow the user using fax machine 101 to publish documents on the Web. FIG. 7 illustrates the process of the present invention for publishing a document on the Web. Referring to FIG. 7, in order to publish a document on the Web, a user initially obtains a hard copy of the document to be published (processing block 701). In one embodiment, the user prints a copy of the document or receives the document from another source. The user then faxes the hard copy to a gateway server (processing block 702). In one embodiment, gateway 102 also acts as the gateway server.

The gateway server receives the fax image (processing block 703) and creates a document (processing block 704). In one embodiment, the faxed image is parsed by the gateway server to create the document. The document may be a hypertext (e.g., html) document. Also creating the document may be as simple as placing a wrapper around the image (e.g., an html document containing the fax image as an embedded graphic, etc.) or as complex as performing optical character recognition (OCR) or form creation on the faxed image.

Once the document is created, the gateway stores the document along with the image in a local memory (e.g., disk) and an association to the fax user (processing block 705). The association may indicate the user's fax machine number.

Next, the gateway creates an identifier/locator (e.g., URL) for the document (processing block 706) and adds the appropriate links to that identifier/locator (processing block 707).

When complete, the gateway notifies the sender of the identifier/locator (processing block 708). In one embodiment, links from the initial (home) page or "store front" to the identifier/locator are added.

At this time, the gateway server services requests for that document from Web clients (processing block 709). When the gateway receives a request for the document, the gateway sends it by fax or by normal Internet "http" protocol to the requesting agent. Also when receiving the document as part of a document request, the gateway is able to identify the documents that are requested and forward those onto the requesting agent.

In addition, the gateway of the present invention could also handle requests from clients on behalf of the gateway server. For example, if the document is a form to be filled out, the gateway could process the filled out form and fax it to the user's fax machine.

One Embodiment of the Gateway of the Present Invention

One embodiment of the gateway of the present invention comprises a computer system or workstation having at least a processor, random access memory, and a bus, and runs an operating system, etc. FIG. 8 is a block diagram of one embodiment of the computer system that may incorporate the teachings of the present invention. Referring to FIG. 8, computer system 800 comprises a bus or other communication means 801 for communicating information, and a processor 802 coupled with bus 801 for processing information.

System 800 further comprises a random access memory (RAM) or other dynamic storage device 804 (referred to as main memory), coupled to bus 801 for storing information and instructions to be executed by processor 802. Main memory 804 also may be used for storing temporary variables or other intermediate information during execution of instructions by processor 802. Computer system 800 also comprises a read only memory (ROM) and/or other static storage device 806 coupled to bus 801 for storing static information and instructions for processor 802, and a data storage device 807 such as a magnetic disk or optical disk and its corresponding disk drive. Data storage device 807 is coupled to bus 801 for storing information and instructions.

Computer system 800 also comprises fax modems 840 and an Internet connection 841. Internet connection 841 may be a local area connection (e.g., ethernet) or maybe an ISDN line. In another embodiment, Internet connection 841 may be a modem running PPP or SLIP. The present invention is not limited to use with the Internet and, thus, the connection 841 may be for use in connection to any network using the TCP/IP or other protocols, to which a "router" is connected that allows communication with some other network. The two networks form an "Internetwork". Internet refers to the largest, global set of such connected networks which may pass information back and forth between them. The methods of connecting to a network include a physical communications link, such as ethernet, ISDN, modem and phone lines, or wireless modems, and TCP/IP, SLIP, or PPP software.

Computer system 800 may further include various input/output peripherals, such as a display device, such as a cathode ray tube (CRT) or liquid crystal display (LCD) coupled to bus 801 for displaying information to a computer user. An alphanumeric input device, including alphanumeric and other keys, may also be coupled to bus 801 for communicating information and command selections to processor 802. An additional user input device is cursor control, such as a mouse, a trackball, stylus, or cursor direction keys, coupled to bus 801 for communicating direction information and command selections to processor 802, and for controlling cursor movement on a display. Another device which may be coupled to bus 801 is hard copy device which may be used for printing instructions, data, or other information on a medium such as paper, film, or similar types of media.

Note that any or all of the components of system 800 and associated hardware may be used, however, it can be appreciated that any type of configuration of the system may be used for various purposes as the user requires.

The user, or client, may have a similar computer system that is coupled to the gateway of the present invention, permitting exchanging of documents (through phone lines), display of images and on-screen/cursor-controlled selection of links.

As a gateway, computer system 800 of the present invention may run various software to perform a variety of functions. In one embodiment, computer system 800 runs Internet communications protocol software, such as, for example, TCP/IP, which is well known to those skilled in the art. Computer system 800 also runs fax modem driver software used to send and receive faxes, as well as the HyperTexts Transfer Protocol (HTTP) server software, such as, for instance, CERN or NCSA server software, which are well-known in the art. Control software is also run by computer system 800 for handling faxed images as described above. Also, the computer system runs software (e.g., HTTP client software) to retrieve an identifier/locator (e.g., a URL) and format it appropriately for a fax machine.

In one embodiment, to determine where to return retrieved documents, software running in computer system 800 obtains the return phone number. The phone number may also be obtained during the handshaking that occurs as part of the standard interface to fax machine 101. Once the phone number is obtained from the handshake, the software incorporates it into the Tiff image. In an alternative embodiment, fax machines remain in communication (connected) with the gateway while the document is retrieved and then sent back.

In one embodiment, when processing the image, software running in computer system 800 crops the margins of the image, identifies which active regions have been circled, fills-in those areas of the image that have not been circled, locates and parses any remaining machine readable identifiers, and for each machine readable paper mark decoded, and finds the corresponding URL in a database of URLs that have been sent to the user.

Note that in one embodiment, each document is assigned a unique ID when it is rendered by the gateway. This ID is printed at the top of the document and specifies the name of a file which holds the mapping between the machine readable codes and the URLs.

After processing the image, computer system 800 passes each URL and the return phone number to retrieval and rendering software. The retrieval and rendering engine retrieves the URL, parses the document, renders it (including the digital paper), updates the data base of document identifiers, and sends the rendered document by fax to the return phone number.

The retrieval and rendering software retrieves the URL and converts each URL in the retrieved document to a global URL which includes a full specification of the location of the link.

In one embodiment, software converts the retrieved document, which is in html format, to PostScript format or directly to G3 "fax" format. The in-line images are also retrieved and converted to PostScript for inclusion in the document. Note that in this embodiment, html source is converted to "LaTEX" format. That is, the html source is converted into source for the LaTEX document formatting system. The LaTEX source includes commands to generate the digital paper marks. Software running on computer system 800 assigns link numbers to each link and includes the appropriate LaTEX commands in a LaTEX source file to print those codes in machine readable format. Note that one mark is created to identify the document and is printed as a header on each page. Software also stores a list of codes and URLs in a temporary file. The machine readable identifiers are created and the machine readable code is printed under the text. Software running on computer system 800 then generates the PostScript image using, for example, LaTEX dvips.

Latex is a macro package for Tex, a software program written by Donald Knuth at Stanford University, Palo Alto, Calif. Latex generates "dvi" (device independent) output from the LaTEX source. These can be translated to PostScript using "dvips" a software program written by Thomas Rokicki at Stanford University, Palo Alto, Calif. All these programs are well known in the art.

In sum, any document on the World Wide Web may be retrieved through the gateway of the present invention. All the user needs is a phone number of the gateway of the present invention. A gateway may a service a regional area or be a proxy machine for all the facsimile machines known to it.

The present invention may be used for Web transactions, such as obtaining product information, looking for a home, entertainment information such as movie listings, and stock market quotes. Although content is a user design, in one embodiment, a home page includes icons for product information, entertainment and browsing open houses. Follow-up pages for each of these icons may include a list of products, movie/restaurant/etc.

Furthermore, each page may include some additional machine readable information. In one embodiment, one mark per page identifies that page, and a bit of machine readable information is printed under each active link. Thus, URL referencing can be done in a robust, page independent manner.

With few modifications, the gateway of the present invention may be used by companies that wish to provide their "fax" customers with Web access. Companies would enjoy great exposure to the faxed customers access in the Web through their gateway. For example, they could add advertisements or charge for using the gateway service.

Finally, a modified version of the gateway could be a faxed enhancement or replacement machine that individuals could use directly. This machine would be able to interface to the Internet protocol directly and would dial up an Internet access point when asked to retrieve a Web document. In this case, one benefit would be greatly simplified access to the World Wide Web (and) using basic functionality of the fax machine. Note that in addition to the Web access, such a machine could provide E-mail access. The gateway could also provide e-mail access. A simple script running on users machine could translate e-mail into html format, which the gateway could then access and deliver to user.

Whereas, many alterations and modifications of the present invention will no doubt become apparent to a person of ordinary skill in the art after having read the foregoing description, it is to be understood that the particular embodiment shown and described by way of illustration are in no way to be considered limiting. Therefore, reference to the details of the various embodiments are not intended to limit the scope of the claims which themselves recite only those features regarded as essential to the invention.

Thus, a document retrieval and publication system has been described.

I claim:

1. A method for accessing information comprising the steps of:

receiving an image of a first document from a first location;

extracting a document identifier from the image;

retrieving a second document corresponding to the document identifier; and dynamically generating an image of the second document, including the step of encoding links to other documents in the second document into machine readable codes;

sending the image of the second document to the first location.

2. The method defined in claim 1 further comprising the step of locating in the image the machine readable codes near locations of the links to other documents that are in the second document.

3. The method defined in claim 1 wherein the image of the second document is sent by facsimile transmission.

4. A method for processing information comprising the steps of:

receiving a facsimile of a first document from a location;

extracting a resource identifier from the facsimile;

retrieving a second document corresponding to the resource identifier;

rendering hypertext links in machine readable information near link points in the image; and sending by facsimile the image of the second document to the location.

5. The method defined in claim 4 further comprising the step of parsing the second document to create the image.

6. The method defined in claim 4 wherein the resource identifier comprises a universal resource locator (URL).

7. The method defined in claim 4 wherein the second document is retrieved from a network.

8. The method defined in claim 4 wherein the step of extracting the resource identifier comprises extracting selected encoded information in the facsimile and decoding the information to obtain the resource identifier.

9. The method defined in claim 8 wherein the encoded information comprises bar codes.

10. The method defined in claim 8 wherein the encoded information comprises digital paper.

11. The method defined in claim 8 wherein the encoded information comprises run length encoded information.

12. The method defined in claim 4 wherein the step of receiving the facsimile comprises receiving the facsimile using a fax modem.

13. The method defined in claim 4 wherein the step of extracting a resource identifier comprises the steps of:

filling regions of the facsimile other than those encircled with a uniform color;

decoding encoded information in the encircled regions to obtain at least one code; and identifying at least one resource identifier using said at least one code.

14. The method defined in claim 13 wherein the step of identifying comprises accessing a stored listing using said at least one code as a pointer to said at least one resource identifier.

15. The method defined in claim 4 further comprising the step of rendering the document.

16. The method defined in claim 15 wherein the document is rendered as a bitmap.

17. A method for viewing a document comprising the steps of:

highlighting encoded information in an image on a piece of paper to select at least one document for retrieval wherein the encoded information represents links to other documents;

sending by facsimile a copy of the paper with the highlighted encoded information to a server designed to retrieve said at least one document based on a decoded version of the highlighted encoded information; and creating an image of said at least one desired document including the step of dynamically generating encoded link information and including the encoded link information in the image, wherein the link information specifies at least one other document linked to said at least one document;

receiving by facsimile said at least one desired document retrieved by the server.

18. The method defined in claim 17 wherein the step of highlighting comprises the step of marking the paper so as to substantially surround encoded information on the paper.

19. The method defined in claim 17 wherein the encoded information comprises bar codes.

20. The method defined in claim 17 wherein the step of highlighting comprises the step of circling encoded information on the paper.

21. The method defined in claim 17 wherein the step of highlighting comprises the step of placing a mark on the paper to select encoded information representing at least one hypertext link.

22. The method defined in claim 17 wherein the encoded information indicates at least one URL of a linked document, and wherein the user highlights one or more of said at least one URL to view the linked document associated with highlighted URLs.

23. The method defined in claim 17 further comprising the step of obtaining the image by sending a facsimile of an image to the server.

24. The method defined in claim 23 wherein the image is a blank page.

25. The method defined in claim 17 further comprising the steps of:

highlighting encoded information in one of said at least one document retrieved by the server and received;

sending by facsimile a copy of said one of said at least one document with the highlighted encoded information to a server designed to retrieve one or more documents based on a decoded version of the highlighted encoded information in said one of said at least one document; and receiving by facsimile said one or more documents retrieved by the server.

26. An apparatus for retrieving documents from a source having a group of resources in response to a document request received from a facsimile machine, said apparatus comprising:

a system having a bus; a processor coupled to the bus; and at least one memory coupled to the bus;

a facsimile mechanism coupled to the system to send and receive facsimile images; and a connection mechanism coupling the system to the source;

wherein the system receives a facsimile image from the facsimile machine, identifies encoded portions selected by a user, decodes the identified encoded portions into decoded data, retrieves at least one document from the source corresponding to the decoded data, dynamically generates an image of the document with encoded link information specifying links to other documents, and sends said at least one document by facsimile to the facsimile machine using the facsimile mechanism, such that the apparatus serves as a gateway between source and the facsimile machine.

27. The apparatus defined in claim 26 wherein the source comprises a network and the connection mechanism couples the system to the network.

28. The apparatus defined in claim 26 wherein the source comprises a local area network (LAN) and the connection mechanism couples the system to the LAN.

29. The apparatus defined in claim 26 wherein the facsimile mechanism comprises at least one FaxModem.

30. An apparatus for retrieving documents from a source having a group of resources in response to a document request, said apparatus comprising:

means for processing a document to obtain an identifier;

means for retrieving a document corresponding to the identifier;

means for rendering the document after retrieval, including means for encoding link information into machine readable information into the document being rendered such that links to other documents are available; and means for sending a facsimile image of the document after retrieval and rendering.

31. A method for publishing a document using a facsimile machine, said method comprising the steps of:

receiving a facsimile image from a facsimile machine;

parsing the image to create a document;

storing the document with information indicating an association between the document and the facsimile machine;

creating a resource locator for the document;

adding links to the resource locator in the form of machine readable information; and servicing requests for the document.

32. The method defined in claim 31 wherein the document comprises a html document.

33. The method defined in claim 31 wherein the resource locator comprises a URL.

34. The method defined in claim 31 further comprising the step of notifying the sender of the image of the resource locator.

* * * * *